United States Patent Office 2,846,762
Patented Aug. 12, 1958

2,846,762
METAL PLATING PROCESS

David E. Walker, Park Forest, and Robert A. Noland, Chicago, Ill., assignors to the United States of America as represented by the United States Atomic Energy Commission No Drawing. Application February 17, 1955
Serial No. 489,002

7 Claims. (Cl. 29—471.5)

This invention deals with a process of plating uranium metals with steel and metals of the iron group as defined in "General Chemistry" by H. I. Schlesinger, third edition, page 780, namely, iron, nickel or cobalt. (The term uranium metals is to encompass elemental uranium as well as alloys which have uranium as the predominant component.)

Uranium is a highly reactive metal, and for most purposes it has to be protected against corrosion, for example, by cladding with a metal of the iron group. Protection of uranium is particularly important and has to be of particularly high quality in the case of reactor parts. For instance, in the power breeder reactor $U^{235}$-enriched uranium is used in the form of blankets, rods, slugs or tubes and all these elements have to be enclosed in jackets in order to protect them from the harmful effect of the atmosphere and/or the coolant. Stainless steel and nickel have been used for this purpose. For satisfactory coating the claddings have to be bonded to the uranium core, and the bond has to be durable, flexible, reliable and resistant to the elevated temperatures which prevail during the operation of the neutronic reactors. The bonds also have to have a good heat conductivity in order to make a good cooling effect possible throughout the uranium core.

One method of accomplishing such a bond used heretofore comprises silver plating the surfaces of the core and the cladding parts to be bonded to each other, alloying the silver coatings with mercury or indium and then pressure bonding the assembled parts of the cladding and core. This process is disclosed and claimed in copending application Serial No. 105,907, filed by Henry A. Saller et al. on July 20, 1949. However, for some reactor purposes the neutron capture cross section is somewhat high due to the presence of indium and mercury, respectively. In other processes used for bonding steel or the like to uranium cores, it has been held necessary to accomplish a reduction of at least 50% during the pressure bonding step. Such a high reduction makes it very difficult to obtain predetermined dimensions of the final element with a sufficiently high degree of precision.

It is an object of this invention to provide a process of cladding uranium metals with metals of the iron group by which the cladding metal is securely and durably bonded to the uranium metal.

It is another object of this invention to provide a process of cladding uranium metals with metals of the iron group by which a bond of great ductility is obtained.

It is another object of this invention to provide a process of cladding uranium metals with metals of the iron group by which clad elements of good thermal conductivity are obtained.

It is another object of this invention to provide a process of cladding uranium metals with metals of the iron group by which an element is obtained that does not warp or dimensionally change by more than a negligibly low amount under the influence of elevated temperatures or thermal fluctuations.

It is another object of this invention to provide a process of cladding uranium metals with metals of the iron group whereby a unit is obtained which shows a high degree of corrosion resistance.

It is another object of this invention to provide a process of cladding uranium metals with metals of the iron group by which a clad element is obtained in which diffusion does not take place at elevated temperature between the cladding metal and the uranium or between the bonding metal and the uranium.

It is another object of this invention to provide a process of cladding uranium metals with metals of the iron group by which a unit of relatively low neutron capture cross section is obtained.

It is finally also an object of this invention to provide a process of cladding uranium metals with metals of the iron group by which predetermined dimensions can be obtained with great accuracy.

These objects are accomplished by coating the surfaces to be bonded of both the uranium core and the cladding of iron group metal with a thin silver layer, assembling said uranium core and the cladding so that the silver layers of both are in contact with each other, and rolling the assembly formed thereby at between 550 and 650° C. so as to cause a reduction of thickness of between 10 and 50%.

Silver is insoluble in uranium and stainless steel, and the interface between the core and the cladding thus remains pure silver. The silver consequently forms a barrier between the cladding and the core and diffusion between the cladding metal and the uranium can therefore not take place. The bond has all the properties of silver such as its tensile strength, its high ductility and its thermal conductivity.

The silver coatings may be applied to the uranium and the cladding by any methods known to those skilled in the art, for instance by hot dipping or by electroplating. The latter method is preferred, because no oxygen absorption or oxide formation occurs thereby. An electrolyte containing 75 grams per liter of silver cyanide, 122 grams per liter of potassium cyanide, 22.5 grams per liter of potassium carbonate, and potassium hydroxide in a quantity to raise the pH value to 13 has been found highly satisfactory for this purpose. The temperature of this bath was 45° C., and the current density varied between 5 and 25 amps./sq. ft. Electrolysis is carried out until the silver deposit has the desired thickness. The thickness of the silver layer is advantageously not more than 2 mils, but thicknesses of 1 mil or less are preferred.

The cladding can have a thickness as low as from 5 to 10 mils, but higher thicknesses proved also satisfactory. The thickness of the cladding does not necessitate any changes in the method; it is dependent on the use intended of the clad article.

The silver-plated uranium core and cladding parts are then assembled. In some cases it has been found advantageous to weld the edges of the assembled unit in a press, for instance with an inert gas-shielded arc, in order to prevent air pockets and oxidation and to hold the various parts of the assembly in proper spatial relationship. However, this step is optional and satisfactory results have been obtained without it.

The unit is then pressure-rolled at alpha-phase temperatures of the uranium, which means below a temperature of 660° C. Rolling temperatures between 550 and 650° have been found satisfactory, a temperature of about 650° C. being preferred. During the rolling step the thickness of the unit is reduced. The less this reduction is the easier it is to accomplish dimensional accuracy, because with a lower reduction the width increases less. As low a reduction as 10% has given a satisfactory and firm bond, but reduction up to 50% can be used, as has been mentioned before. Reductions between 10 and 30% gave the most favorable results. Rolling can be carried out by applying one or several passes through the rolling mill, each pass being preferably adjusted so that it accomplishes a reduction of 10%. Thus, if the unit is to be reduced by 10%, one pass is sufficient.

In the following, an example is given for the purpose of illustrating the invention without the intention to limit the scope of the invention to the details disclosed therein.

*Example*

A uranium slug 2½ inches wide, 15 inches long and 0.062 inch thick was used as the core for each element. It was first subjected to a pretreatment which consisted of degreasing with trichloroethylene, immersing in a 70% nitric acid at room temperature, rinsing with cold tap water, anodic treatment for about 5 minutes in a mixture containing 50% by volume of phosphoric acid and 20 cc. of concentrated hydrochloric acid per liter at a temperature of 40° C. and a current density of 0.5 amp./sq. in., rinsing with tap water and pickling in a 70% nitric acid at room temperature, and rinsing with water.

The slug was then silver-plated on all sides by making it the cathode in an electrolyte containing 30 grams of silver cyanide per liter of solution, 55 grams of potassium cyanide per liter, and 44 grams of potassium carbonate per liter; the temperature of the electrolyte was about 25° C., the current density 5 amps./sq. ft. and the voltage 1 volt. Electrolysis was carried out until the silver deposit was 0.002 inch thick.

Stainless steel plates were then also silver-plated on one side by the same method with a 0.002-inch thick layer. The cladding elements comprised two plates, one for the top and one for the bottom, two side strips and two end strips. The top and bottom plates, before the silver-coating, each was 3%6 inches wide, 16 inches long and 20 mils thick, the two side strips each 0.5 inch wide, 0.062 inch thick and 16 inches long, and the two end strips each 2½ inches wide, 0.062 inch thick and 0.5 inch long. The cladding elements and the uranium slug were assembled so that their silver-plated faces contacted each other. The assembly had the following approximate dimensions: 0.11 inch x 3%6 inches x 16 inches.

The assemblies were then roll-bonded at 650° C. The rolls of the rolling mill were 24 inches long and had a diameter of 16 inches. The assemblies were preheated for 40 minutes to obtain the temperature of 650° C. Five passes were carried out and each brought about a reduction of approximately 10%. After each pass the assemblies were turned by 180° and reheated at 650° C. for about 10 minutes. The speed of the rolls was 100 feet per minute. After this treatment the clad uranium slugs were allowed to cool to room temperature. The final dimensions were 0.062 inch x 3⅝ inches x 28.5 inches, and this amounted to a reduction of the thickness of approximately 45%.

The quality of the bond thus produced was tested by welding a cylindrical stud of stainless steel to the stainless steel cladding and another stainless steel stud to the opposite side of the cladding, both studs extending in vertical directions from the surfaces to which they were attached and on diametrically opposite points. Immediately around the first stud the cladding material was then removed whereby a circular groove was formed the bottom surface of which was the uranium interface. This sample was then inserted in a tensile testing machine and tested by applying pulling forces to the two studs in opposite directions. The silver broke at a load of 782 lbs. which corresponds to a tensile strength of above 19,600 p. s. i.; this is equivalent to the tensile strength of silver. The fracture took place entirely in the silver layer, and both the silver-uranium and the silver-stainless steel interfaces remained intact.

Part of a clad uranium core was then subjected to a cycling treatment consisting of 210 cycles each of which comprised heating for 2 minutes at 50° C., heating to 550° C. within 1½ minutes, holding at 550° C. for 2 minutes and cooling to 50° C. within 5 seconds. The slug did not change its dimensions and remained flat. Another piece of uranium which had the same dimensions as the core but was unclad was also subjected to the same thermal cycling as a control; it warped like a potato chip.

It will be understood that the process of this invention is applicable to the cladding of uranium parts of various shapes, such as rods, wafers, and the like. It will also be understood that this invention is not to be limited to the details given herein but that it may be modified within the scope of the appended claims.

What is claimed is:

1. A process of firmly bonding a cladding of metal of the group consisting of steel and metals of the iron group to a member of uranium metal comprising coating said uranium member with silver, applying a silver layer to said cladding, assembling the cladding and the uranium member so that silver-coated surfaces contact each other, and pressure-rolling the assembly formed at between 550 and 650° C. until a reduction of from 10 to 50% has been obtained.

2. The process of claim 1 wherein the silver coatings have a maximum thickness of 2 mils.

3. The process of claim 1 wherein the silver coatings have a maximum thickness of 1 mil.

4. The process of claim 1 wherein the cladding is of stainless steel.

5. The process of claim 1 wherein the cladding is of nickel.

6. The process of claim 1 wherein the rolling temperature is about 650° C. and the reduction of thickness brought about ranges between 10 and 30%.

7. A process of firmly bonding a cladding of stainless steel to a member of uranium metal comprising coating said uranium member on all sides with a silver layer of about 1 mil, applying a silver layer of about 1 mil to one surface of said cladding, assembling the cladding and the uranium metal member so that silver-coated surfaces contact each other, welding the edges of the unit thus formed in an inert gas-shielded arc, and pressure-rolling the unit at about 650° C. until a reduction of from 10 to 30% has been obtained.

No references cited.